(No Model.)
E. ROBERTSON.
GATE.
No. 580,469.　　　　　　　Patented Apr. 13, 1897.
2 Sheets—Sheet 1.
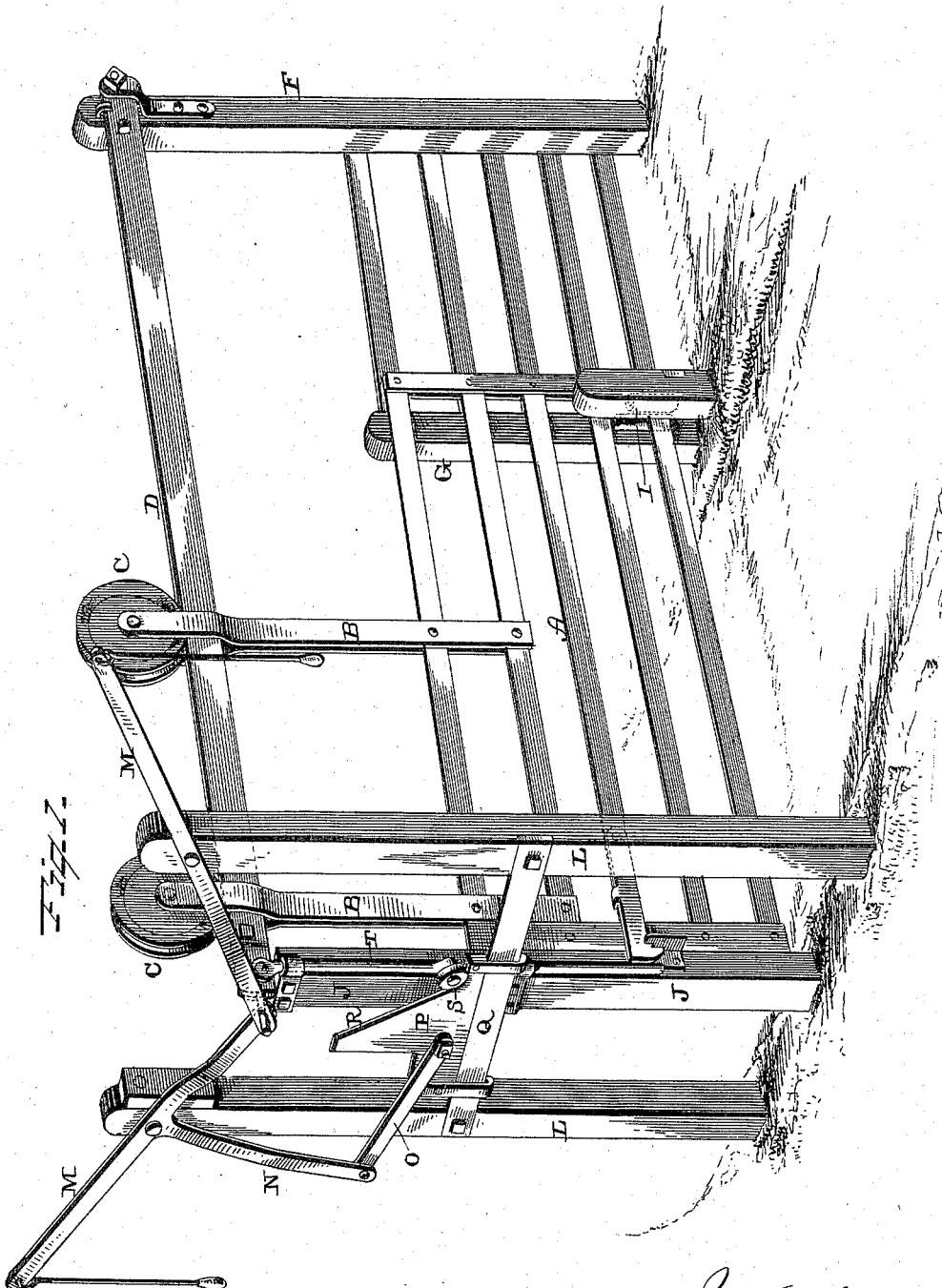

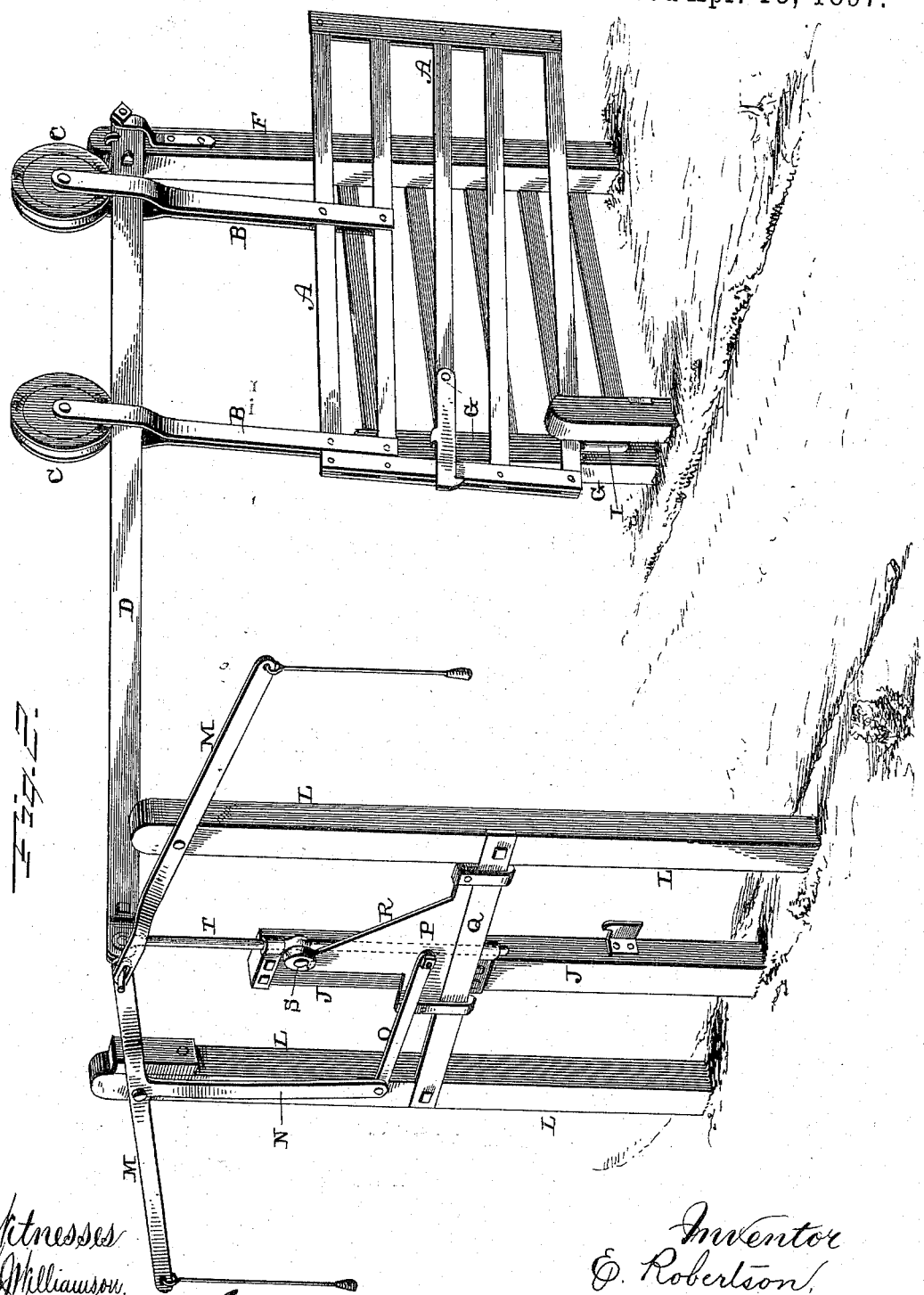

UNITED STATES PATENT OFFICE.

EDWIN ROBERTSON, OF FAIRMOUNT, ILLINOIS, ASSIGNOR OF ONE-HALF TO JOHN F. HORNEY, OF CHRISMAN, ILLINOIS.

GATE.

SPECIFICATION forming part of Letters Patent No. 580,469, dated April 13, 1897.

Application filed October 6, 1896. Serial No. 608,000. (No model.)

*To all whom it may concern:*

Be it known that I, EDWIN ROBERTSON, a citizen of the United States, residing at Fairmount, in the county of Vermilion and State of Illinois, have invented certain new and useful Improvements in Gates; and I do hereby declare that the following is a full, clear, and exact description of the same, reference being had to the annexed drawings, making a part of this specification, and to the letters of reference marked thereon.

My invention relates to an improvement in self opening and closing gates which are especially adapted for use upon farms and which cannot be opened by animals in any possible manner.

In the accompanying drawings, Figures 1 and 2 are perspectives of a gate which embodies my invention, one showing the gate closed and the other open.

A represents an ordinary sliding gate, which is supported by the two uprights B and the rollers C from the supporting-rod D, which is pivoted at its outer end upon the post F. The gate A is of any ordinary construction, and has a simple sliding movement back and forth in a line with the supporting-rod D and is prevented from having any lateral movement in one direction by the fence-post G and in the other by the guiding friction-roller I at its lower edge. The gate in opening moves outwardly against the post F and in closing abuts at its inner end against the post J.

Upon opposite sides of the post J are posts L, upon the upper ends of which are pivoted the operating-levers M, which are connected at their inner ends to the free end of the supporting-rod D. When the outer ends of the levers M are drawn downward, their inner ends are raised, carrying the free end of the supporting-rod D sufficiently high to form an inclined plane, down which the gate A slides toward the post F, and thus the gate is caused to open. When the outer ends of the levers M are raised, the free end of the supporting-rod D drops until it rests upon the top of the post J, and then the rod D forms an inclined plane in the opposite direction, down which the gate rolls until it strikes against the post J, when it is closed.

In order to hold the rod D in a raised position, one of the levers M has an arm N rigidly secured thereto, which projects downward any suitable distance, and to the lower end of this arm N is fastened loosely the connecting-rod O. This has its other end attached to the slide P, which moves horizontally back and forth upon the gu de Q, which is fastened rigidly to the two posts L. One edge of the slide P forms an inclined plane R. At the upper end of this inclined plane is a suitable supporting-surface and at its lower one is formed a recess, in which the grooved friction-roller S rests when the gate is closed.

As the outer ends of the levers M are drawn downward the free end of the rod D is raised, and as this rod D rises the rod T and the roller S, pivoted thereon, are raised at the same time, and the slide P is forced forward upon its guide Q by the connecting-rod O and arm N, attached to one of the levers. The slide P serves as a support for the roller and rod T, and this rod T supports the free end of the rod D, so as to form an outward incline, down which the gate runs against the post F. As long as the outer ends of the levers M are depressed and the upper end of the slide P rests under the roller S the free end of the rod D will be held in a raised position and the gate A will remain open. When the outer ends of the levers M are raised, the slide P is drawn from under the roller S, and then the free end of the rod D sinks and the gate rolls down the inward incline and closes.

Having thus described my invention, I claim—

1. A sliding or rolling gate, and a pivoted rod from which it is suspended and upon which it moves back and forth, combined with a mechanism for raising the free end of the supporting-rod, a rod depending from the free end of the supporting-rod and a slide forced by the operating mechanism under said depending rod, and thus made to hold the free end of the supporting-rod in a raised position and keep the gate open, substantially as shown.

2. A sliding or rolling gate, and a pivoted supporting-rod from which the gate is suspended, and which rod is free to rise and fall at its inner end, combined with operating-levers pivoted upon supporting-posts, and having their inner ends connected to the supporting-rod, a rod depending from the free end of the supporting-rod and a slide forced by one of the levers under said depending rod for holding the free end of the supporting-rod in a raised position, so as to keep the gate open, substantially as described.

3. A sliding or rolling gate, combined with means connected thereto for suspending it, a supporting-rod pivoted at one end, upon which the gate moves back and forth, two pivoted levers placed upon suitable supports, and having their inner ends connected to the free end of the supporting-rod, a rod connected to the free end of the supporting-rod, and provided with a roller, a slide having an inclined surface, and operated by one of the levers, and a guide upon which the slide moves, substantially as set forth.

4. In a gate, the posts F, J, L, the supporting-rod D pivoted at one end upon the post F, and having its free end supported by the post J, when the gate is closed; and a sliding gate suspended from the rod D so as to freely move back and forth thereon, combined with the operating-levers M pivoted upon the posts L, and having their inner ends connected to the free end of the supporting-rod D, a depending rod T, provided with a roller S, connected to the free end of the rod D; a guide Q, a slide placed thereon, and means connected to one of the levers for moving the slide back and forth upon its guide, substantially as shown.

In testimony that I claim the above I have hereunto subscribed my name in the presence of two witnesses.

EDWIN ROBERTSON.

Witnesses:
G. W. KIDD,
CHARLES W. COX.